US012691460B2

(12) United States Patent
Lee

(10) Patent No.: US 12,691,460 B2
(45) Date of Patent: Jul. 28, 2026

(54) TREATMENT LIQUID SPRAY NOZZLE

(71) Applicant: DEVICE CO., LTD., Chungcheongnam-do (KR)

(72) Inventor: Taek Youb Lee, Cheonan-si (KR)

(73) Assignee: DEVICE CO., LTD., Chungcheongnam-do (KR)

( * ) Notice: Subject to any disclaimer, the term of this patent is extended or adjusted under 35 U.S.C. 154(b) by 217 days.

(21) Appl. No.: 18/609,862

(22) Filed: Mar. 19, 2024

(65) Prior Publication Data

US 2025/0229279 A1 Jul. 17, 2025

(30) Foreign Application Priority Data

Jan. 17, 2024 (KR) ........................ 10-2024-0007529

(51) Int. Cl.
*B05B 7/04* (2006.01)
*B05B 1/14* (2006.01)
*B05B 1/34* (2006.01)

(52) U.S. Cl.
CPC .............. *B05B 7/0408* (2013.01); *B05B 1/14* (2013.01); *B05B 1/341* (2013.01)

(58) Field of Classification Search
CPC .......... B05B 7/0408; B05B 1/14; B05B 1/241
USPC ....... 239/398, 402, 403, 427, 433, 575, 590, 239/590.3, 590.5
See application file for complete search history.

(56) References Cited

U.S. PATENT DOCUMENTS

| | | | | | |
|---|---|---|---|---|---|
| 4,012,201 | A * | 3/1977 | Powell | B01J 4/001 | 239/434 |
| 5,553,783 | A * | 9/1996 | Slavas | B05B 1/3405 | 239/403 |
| 5,603,453 | A * | 2/1997 | Weaver | B05B 7/0892 | 239/427 |
| 10,758,875 | B2 | 9/2020 | Bang et al. | | |
| 2014/0367480 | A1* | 12/2014 | Toh | B05B 1/28 | 239/590.3 |

FOREIGN PATENT DOCUMENTS

| | | | |
|---|---|---|---|
| KR | 1020110000228 | A | 1/2011 |
| KR | 1020110056975 | A | 5/2011 |
| KR | 1020110057679 | A | 6/2011 |
| KR | 1020180051871 | A | 5/2018 |

* cited by examiner

*Primary Examiner* — Steven J Ganey
(74) *Attorney, Agent, or Firm* — BLANK ROME LLP

(57) ABSTRACT

The present disclosure relates to a treatment liquid spray nozzle including: a body having a mixing space portion formed therein to mix a first treatment liquid and a second treatment liquid, a first inlet communicating with the mixing space portion in such a way as to allow the first treatment liquid to flow into the mixing space portion, a second inlet communicating with the mixing space portion in a misaligned direction with the first inlet in such a way as to allow the second treatment liquid to flow into the mixing space portion, and a spray hole formed on the bottom thereof in such a way as to communicate with the mixing space portion; and a rotational flow guiding part disposed in the mixing space portion in such a way as to allow both ends thereof to face the first inlet and the spray hole, while allowing the sectional area toward the spray hole to be smaller than the sectional area toward the first inlet.

11 Claims, 8 Drawing Sheets

*PRIOR ART*

FIG. 6A
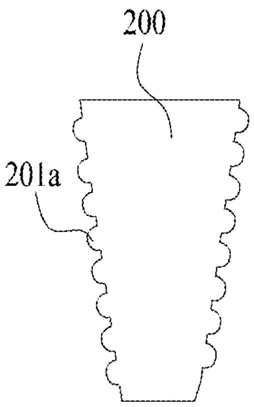
FIG. 6B
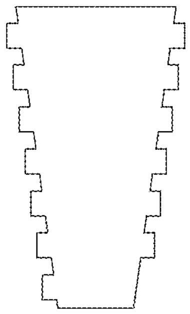
FIG. 6C
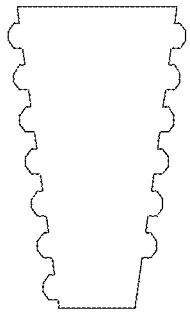
FIG. 6D
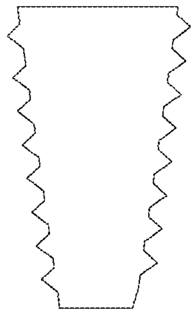
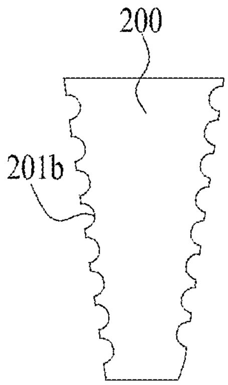
FIG. 6E
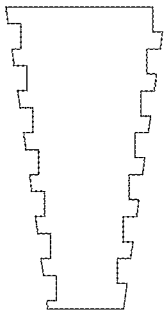
FIG. 6F
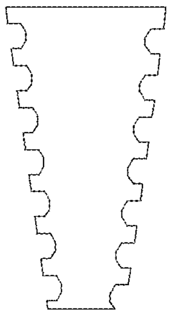
FIG. 6G
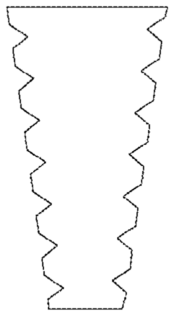
FIG. 6H

TREATMENT LIQUID SPRAY NOZZLE

BACKGROUND OF THE DISCLOSURE

Cross Reference to Related Application of the Disclosure

The present application claims the benefit of Korean Patent Application No. 10-2024-0007529 filed in the Korean Intellectual Property Office on Jan. 17, 2024, the entire contents of which are incorporated herein by reference.

Field of the Disclosure

The present disclosure relates to a treatment liquid spray nozzle, more specifically to a treatment liquid spray nozzle for a substrate treatment apparatus that is capable of mixing two or more treatment liquids to spray the mixed treatment liquids onto a substrate.

Background of the Related Art

Generally, a substrate treatment apparatus is an apparatus that performs, with the use of treatment liquids, various processes such as deposition, photolithography, etching, and cleaning for substrates such as semiconductor wafers, substrate for display, optical disk substrates, magnetic disk substrates, photomask substrates, ceramic substrates, solar cell substrates, and the like.

Among the processes, the cleaning process is performed to remove foreign substances or particles from the substrate, and representatively, a treatment liquid is supplied to top or underside of a substrate to perform the cleaning process for the substrate, while the substrate is rotating at a high speed in a state of being supportedly placed on top of a chuck base (spin head).

A representative example of the treatment liquids is a cleaning liquid that is used for sulfuric acid peroxide mixture (SPM) cleaning in which sulfuric acid and hydrogen peroxide are mixed in a given ratio, and in this case, sulfuric acid and hydrogen peroxide are introduced into a treatment liquid spray nozzle, independently of each other, then mixed with each other, and finally sprayed onto a substrate.

A conventional technology in which vortexes are used to smoothly mix and spray sulfuric acid and hydrogen peroxide has been disclosed, and to generate the vortexes, in this case, a treatment liquid spray nozzle is configured to rotate the sulfuric acid and hydrogen peroxide therein.

For example, the conventional treatment liquid spray nozzle is configured to have a first supply pipe and a second supply pipe located in a tangential direction with respect to the inner peripheral surface of a mixing space portion of a body and to allow sulfuric acid and hydrogen peroxide to be introduced through the first supply pipe and the second supply pipe to thus generate vortexes from the introduced sulfuric acid and hydrogen peroxide, thereby making the sulfuric acid and hydrogen peroxide mixed and sprayed smoothly.

However, even if the sulfuric acid and hydrogen peroxide are introduced into the mixing space portion in the tangential direction with respect to the inner peripheral surface of the mixing space portion, they are not mixed with each other well due to a specific gravity difference therebetween, so that when they are sprayed onto the substrate, the corresponding treatment is not uniformly performed on the entire substrate, thereby undesirably causing the substrate to be defective.

SUMMARY OF THE DISCLOSURE

Accordingly, the present disclosure has been made in view of the above-mentioned problems occurring in the related art, and it is an object of the present disclosure to provide a treatment liquid spray nozzle that is capable of mixing two or more types of treatment liquids uniformly, while overcoming a specific gravity difference thereamong, when the two or more types of treatment liquids are introduced independently of each other, mixed, and sprayed, thereby preventing a substrate from being defective due to spraying.

To accomplish the above-mentioned objects, according to the present disclosure, there is provided a treatment liquid spray nozzle including: a body having a mixing space portion formed therein to mix a first treatment liquid and a second treatment liquid, a first inlet communicating with the mixing space portion in such a way as to allow the first treatment liquid to flow into the mixing space portion, a second inlet communicating with the mixing space portion in a misaligned direction with the first inlet in such a way as to allow the second treatment liquid to flow into the mixing space portion, and a spray hole formed on the bottom thereof in such a way as to communicate with the mixing space portion; and a rotational flow guiding part disposed in the mixing space portion in such a way as to allow both ends thereof to face the first inlet and the spray hole, while allowing the sectional area toward the spray hole to be smaller than the sectional area toward the first inlet, wherein on top of the rotational flow guiding part is located a first perforated plate in such a way as to be coupled to the inner peripheral surface of the mixing space portion, on underside of the rotational flow guiding part is located a second perforated plate in such a way as to be coupled to the inner peripheral surface of the mixing space portion, and the second inlet is located under the first perforated plate.

According to the present disclosure, desirably, the mixing space portion comprises: a first mixing space portion extending from the first perforated plate to the underside of the rotational flow guiding part; a second mixing space portion extending from the underside of the first mixing space portion to top of the spray hole; and a third mixing space portion extending from top of the spray hole to underside of the spray hole, whereby the second perforated plate to which the rotational flow guiding part is coupled is located on the entrance of the second mixing space portion, and the third perforated plate is located on the entrance of the spray hole.

According to the present disclosure, desirably, the entrance of the second mixing space portion has a larger cross-sectional area than the entrance of the spray hole.

According to the present disclosure, desirably, the rotational flow guiding part has a spiral protrusion or groove extending in up and down directions and formed on the outer peripheral surface thereof.

According to the present disclosure, desirably, the mixing space portion of the body that extends from the first perforated plate to the underside of the rotational flow guiding part has a spiral protrusion or groove extending in up and down directions and formed on the inner peripheral surface thereof.

According to the present disclosure, desirably, the rotational flow guiding part comprises a first inside inlet hole extending from top facing the first inlet to the interior thereof in up and down directions and a plurality of first inside outlet holes branched from the first inside inlet hole toward the mixing space portion.

According to the present disclosure, desirably, the first inside inlet hole is formed at a position facing the first inlet.

According to the present disclosure, desirably, the body comprises a second inside inlet hole extending from one end facing a space above the first perforated plate to the interior thereof in up and down directions and a plurality of second inside outlet holes branched from the second inside inlet hole toward the mixing space portion.

According to the present disclosure, desirably, the rotational flow guiding part comprises a first inside inlet hole extending from top facing the first inlet to the interior thereof in up and down directions and a plurality of first inside outlet holes branched from the first inside inlet hole toward the mixing space portion, and the body comprises a second inside inlet hole extending from one end facing a space above the first perforated plate to the interior thereof in up and down directions and a plurality of second inside outlet holes branched from the second inside inlet hole toward the mixing space portion.

According to the present disclosure, desirably, a flow rate of the first treatment liquid is smaller than a flow rate of the second treatment liquid.

According to the present disclosure, desirably, the first to third perforated plates are made of plates or mesh type plates each having a plurality of through holes.

BRIEF DESCRIPTION OF THE DRAWINGS

The above and other objects, features and advantages of the present disclosure will be apparent from the following detailed description of the embodiments of the disclosure in conjunction with the accompanying drawings, in which:

FIGS. 6A to 6H are longitudinal sectional views showing another embodiments of a rotational flow guiding part of FIG. 3;

DETAILED DESCRIPTION OF THE PREFERRED EMBODIMENT

Hereinafter, some embodiments of the present invention will be explained in detail with reference to the attached drawings.

Figure 1:
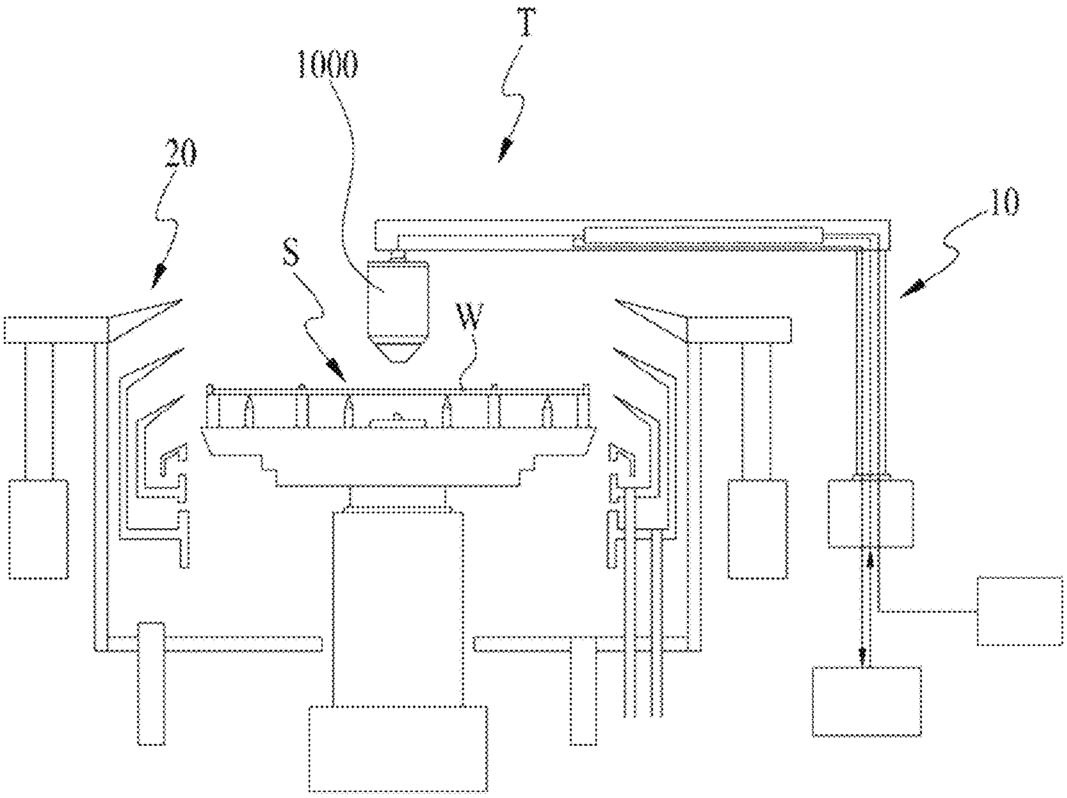
FIG. 1 is a schematic sectional view showing a substrate treatment apparatus.
Figure 2:
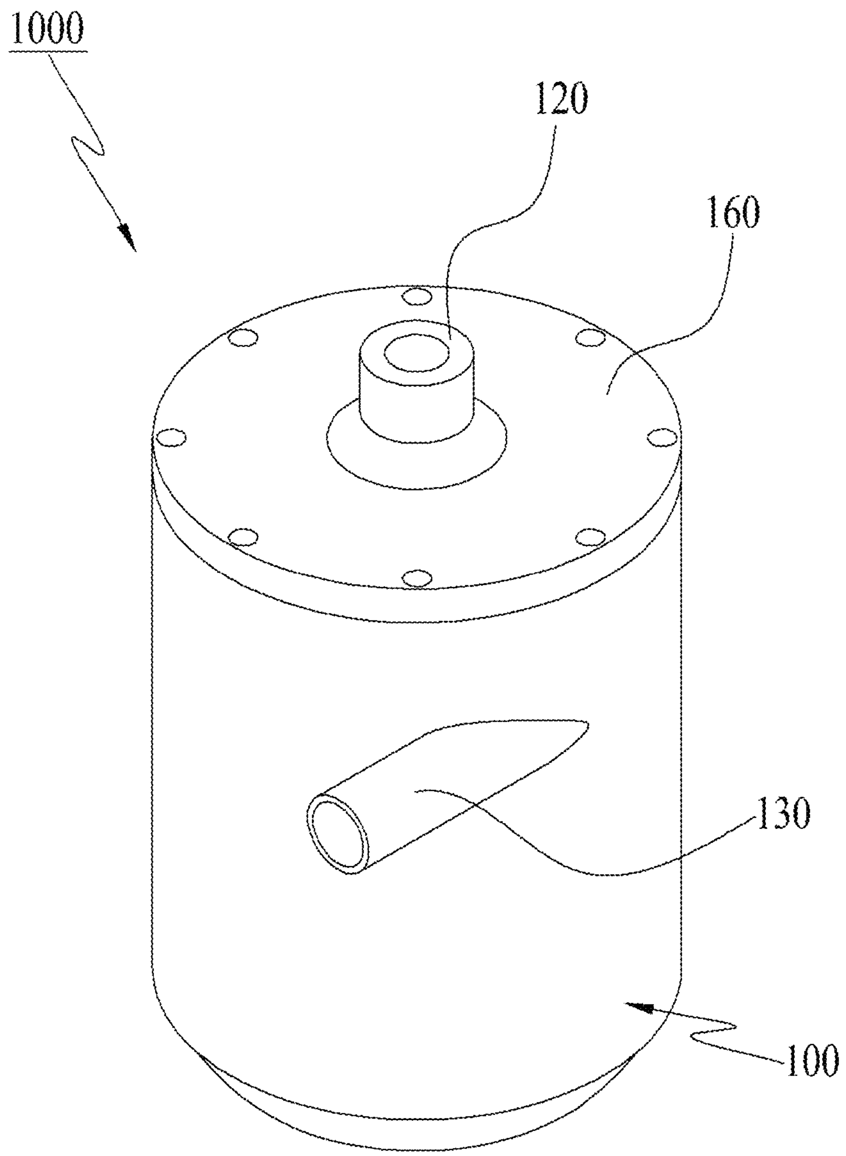
FIG. 2 is a perspective view showing a treatment liquid spray nozzle according to the present invention.

As shown in FIG. 1, generally, a substrate treatment apparatus T includes a treatment liquid spray unit 10, a bowl assembly 20, and a substrate support assembly S.

The treatment liquid spray unit 10 supplies treatment liquids for substrate treatments such as cleaning to a substrate W, and the substrate support assembly S serves to rotate the substrate W in a state of supporting the substrate W, while the substrate treatments are being carried out.

As shown in FIGS. 2 to 8B, a treatment liquid spray nozzle 1000 according to the present invention includes: a body 100 having a mixing space portion 110 formed therein to mix a first treatment liquid 910 and a second treatment liquid 920, a first inlet 120 communicating with the mixing space portion 110 in such a way as to allow the first treatment liquid 910 to flow into the mixing space portion 110, a second inlet 120 communicating with the mixing space portion 110 in a misaligned direction with the first inlet 120 in such a way as to allow the second treatment liquid 920 to flow into the mixing space portion 110, and a spray hole 140 formed on the bottom thereof in such a way as to communicate with the mixing space portion 110; and a rotational flow guiding part 200 disposed in the mixing space portion 110 in such a way as to allow both ends thereof to face the first inlet 120 and the spray hole 140, while allowing the sectional area toward the spray hole 140 to be smaller than the sectional area toward the first inlet 120.

Under such a configuration, the first treatment liquid 910 introduced through the first inlet 120 is sprayed onto top of the rotational flow guiding part 200 and diffused in every direction, and the second treatment liquid 920 introduced through the second inlet 130 moves in a tangential direction with respect to the inner peripheral surface of the mixing space portion 110 and rotates along the inner peripheral surface of the mixing space portion 110, so that vortexes are generated more smoothly from the first treatment liquid 910 and the second treatment liquid 920 through the rotational flow guiding part 200, thereby improving the mixing efficiency of the first treatment liquid 910 and the second treatment liquid 920.

That is, the first treatment liquid 910, which collides against top of the rotational flow guiding part 200 and is diffused in a radial direction, meets the second treatment liquid 920 rotatingly moving along the inner peripheral surface of the mixing space portion 110, and accordingly, the first treatment liquid 910 and the second treatment liquid 920 are naturally mixed together. Further, the mixed treatment liquids move along the outer peripheral surface of the rotational flow guiding part 200 located at the center of the mixing space portion 110 and thus generate the vortexes, so that the treatment liquids are mixed more smoothly and uniformly and then discharged through the spray hole 140, without any difficulty.

Further, a flow rate of the first treatment liquid 910 is desirably smaller than that of the second treatment liquid 920. When the flow rate of the second treatment liquid 920 introduced through the second inlet 130 is larger than that of the first treatment liquid 910, the rotating force of the second treatment liquid 920 through the rotational flow guiding part 200 increases, thereby achieving smooth mixing between the second treatment liquid 920 and the first treatment liquid 910.

As mentioned above, the body 100 includes the mixing space portion 110 formed therein to mix the first treatment liquid 910 and the second treatment liquid 920, the first inlet 120 communicating with the mixing space portion 110 in such a way as to allow the first treatment liquid 910 to flow into the mixing space portion 110, the second inlet 120 communicating with the mixing space portion 110 in a misaligned direction with the first inlet 120 in such a way as to allow the second treatment liquid 920 to flow into the mixing space portion 110, and the spray hole 140 formed on the bottom thereof in such a way as to communicate with the mixing space portion 110.

Further, a first perforated plate 300 having a plurality of through holes 310 formed thereon is located between the first inlet 120 and the mixing space portion 110 to allow the first treatment liquid 910 to be guided to the mixing space portion 110, and one or more perforated plates 400 and 500 are disposed between the underside of the rotational flow guiding part 200 and the underside of the spray hole 140.

That is, the first perforated plate 300 and the perforated plates 400 and 500 are located inside the mixing space portion 110 on top and underside of the rotational flow guiding part 200 respectively in a transverse direction with respect to the spraying direction of the first treatment liquid 910, and the outer peripheral surfaces of the first perforated plate 300 and the perforated plates 400 and 500 are desirably coupled to the inner peripheral surface of the mixing space portion 110.

In detail, the mixing space portion 110 is divided into a first mixing space portion 111 extending from the first perforated plate 300 to the underside of the rotational flow guiding part 200, a second mixing space portion 112 extending from the underside of the first mixing space portion 111 to top of the spray hole 140, and a third mixing space portion 113 extending from top of the spray hole 140 to the underside of the spray hole 140, and accordingly, the second perforated plate 400 to which the rotational flow guiding part 200 is coupled is located on the entrance of the second mixing space portion 112, whereas the third perforated plate 500 is located on the entrance of the spray hole 140.

That is, the first perforated plate 300, which is coupled to the inner peripheral surface of the first mixing space portion 111, is located on top of the rotational flow guiding part 200, and the second perforated plate 400, which is coupled to the inner peripheral surface of the second mixing space portion 112, is located on the underside of the rotational flow guiding part 200.

The first mixing space portion 111, which is a space in which the first treatment liquid 910 and the second treatment liquid 920 are introduced and mixed, is configured to allow the sectional area toward the outlet to be smaller than the sectional area of the space where the first treatment liquid 910 and the second treatment liquid 920 are introduced and mixed so that a given period of time for uniformly mixing such different types of treatment liquids is ensured naturally, thereby discharging the mixed treatment liquids to the second mixing space portion 112.

In this case, the second inlet 130 is formed under the first perforated plate 300, and accordingly, the first treatment liquid 910 introduced through the first inlet 120 collides against top of the rotational flow guiding part 200, spreads in a radial direction of the rotational flow guiding part 200, and is descended uniformly through the first perforated plate 300. Next, the first treatment liquid 910 meets with the second treatment liquid 920 introduced through the second inlet 130 and moving along the inner peripheral surface of the first mixing space portion 111 and is naturally mixed with the second treatment liquid 920, and after that, the mixed treatment liquids move along the outer peripheral surface of the rotational flow guiding part 200, while generating the vortexes, so that the treatment liquids are mixed more smoothly and uniformly and then discharged through the spray hole 140, without any difficulty.

The second mixing space portion 112, which is a space in which the treatment liquids not mixed in the first mixing space portion 111 are additionally mixed, is configured to allow the sectional area toward the outlet thereof to be smaller than the sectional area toward the outlet of the first mixing space portion 111 so that the treatment liquids flow naturally.

The third mixing space portion 113 serves to distribute a plurality of mixed treatment liquid flows through the third perforated plate 500, induce the re-mixing of the treatment liquids therein, and stabilize the flow of the mixed treatment liquids so that the mixed treatment liquids are sprayed through the spray hole 140.

Further, the diameter D3 of the third mixing space portion 113 is smaller than the diameter D2 of the second mixing space portion 112, and the diameter D2 of the second mixing space portion 112 is smaller than the diameter D1 of the first mixing space portion 111.

That is, the entrance of the second mixing space portion 112 has a larger cross-sectional area than the entrance of the spray hole 140.

In detail, the mixing space portion 110 has the shape of steps so that the cross-sectional area for the flow of the treatment liquids from the first inlet 120 to the spray hole 140 becomes gradually small.

Under the configuration where the cross-sectional areas for the flow of the treatment liquids are gradually reduced, the contact surface areas between the first treatment liquid 910 and the second treatment liquid 920 become increased to prevent the treatment liquids from unwantedly gushing out, thereby achieving more perfect mixing and stable discharging.

That is, the treatment liquids are introduced from a large space portion into a small space portion, so that they come into tight contact with each other, thereby improving their mixing efficiency.

Figure 3:
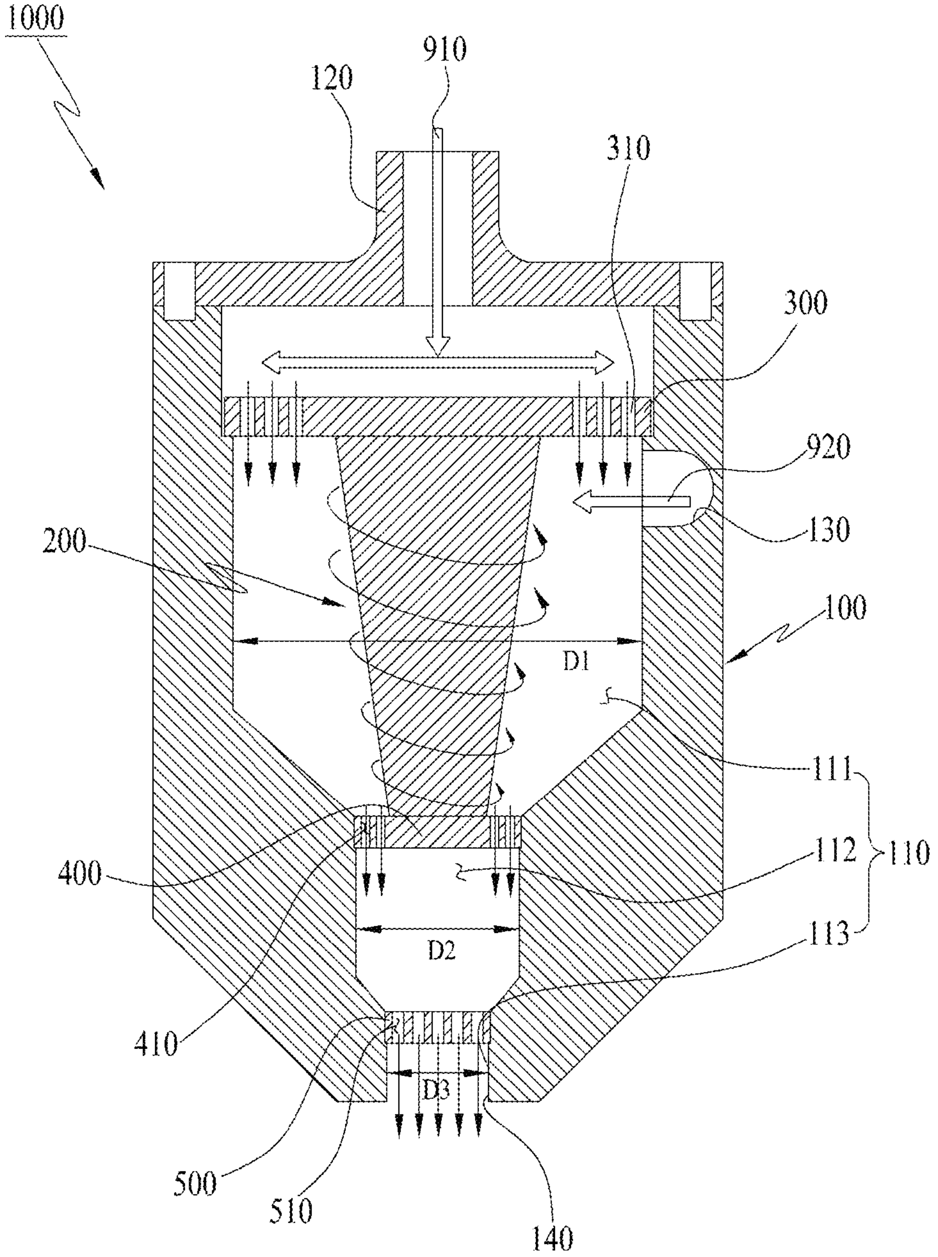
FIG. 3 is a longitudinal sectional view showing the treatment liquid spray nozzle according to the present invention.

Further, as shown in FIG. 3, the mixing space portion 110 of the body 100 is configured to have a tapered surface 101 formed along the inner peripheral surface thereof so that the cross-sectional area from the outlet of the first inlet 120 toward the spray hole 140 becomes reduced.

That is, the mixing space portion 110 has the tapered surface 101 formed along the inner peripheral surface thereof so that the width thereof becomes narrower from the upper portion toward the lower portion thereof, thereby improving the vortexes through which the first treatment liquid 910 and the second treatment liquid 920 are mixed and the mobility of the fluids toward the spray hole 140 and thus achieving smooth and stably spraying.

Further, the tapered surface 101 can be formed at an angle parallel to the inclination of the outer peripheral surface of the rotational flow guiding part 200.

Otherwise, the mixing space portion 110 of the body 100 is configured to have steps or a tapered surface with steps formed along the inner peripheral surface thereof.

Figure 4A:
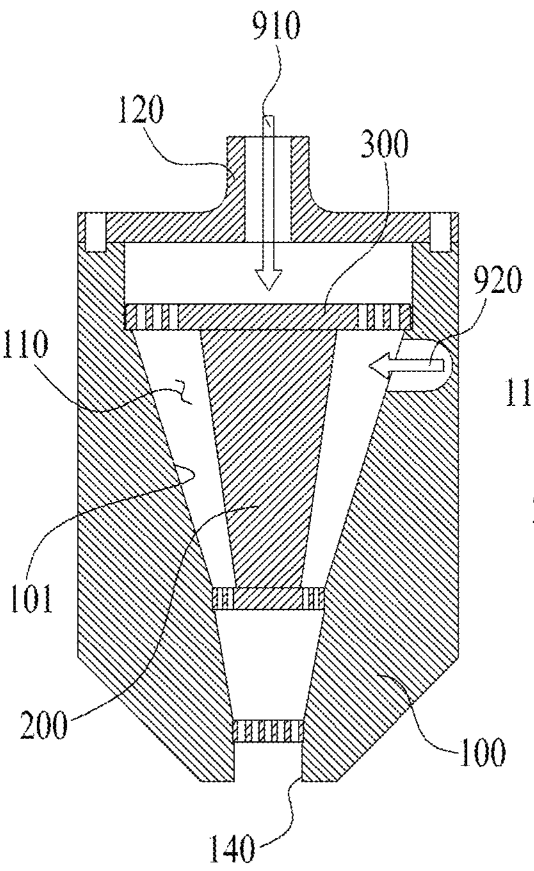
FIGS. 4A and 4B are longitudinal sectional views showing another embodiments of the inner peripheral surface of a mixing space portion of a body of FIG. 3.
Figure 4B:
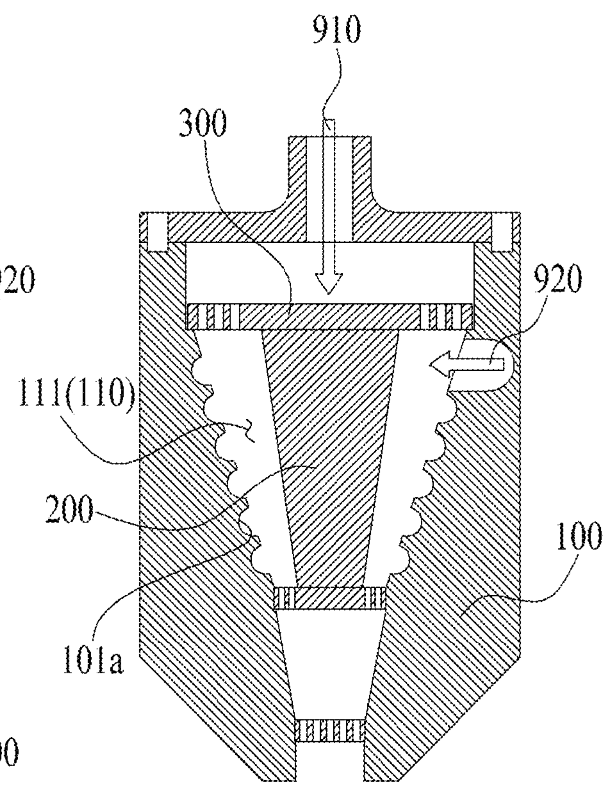

Furthermore, as shown in FIG. 4, the first mixing space portion 111 of the body 100 that extends from the first perforated plate 300 to the underside of the rotational flow guiding part 200 has a spiral protrusion or groove 101*a* extending in up and down directions and formed on the inner peripheral surface thereof.

The spiral protrusion or groove 101*a* has a circular shape or various angled shapes.

The spiral protrusion or groove 101*a* serves to maximize the vortexes through which the treatment liquids are mixed.

Figure 5:
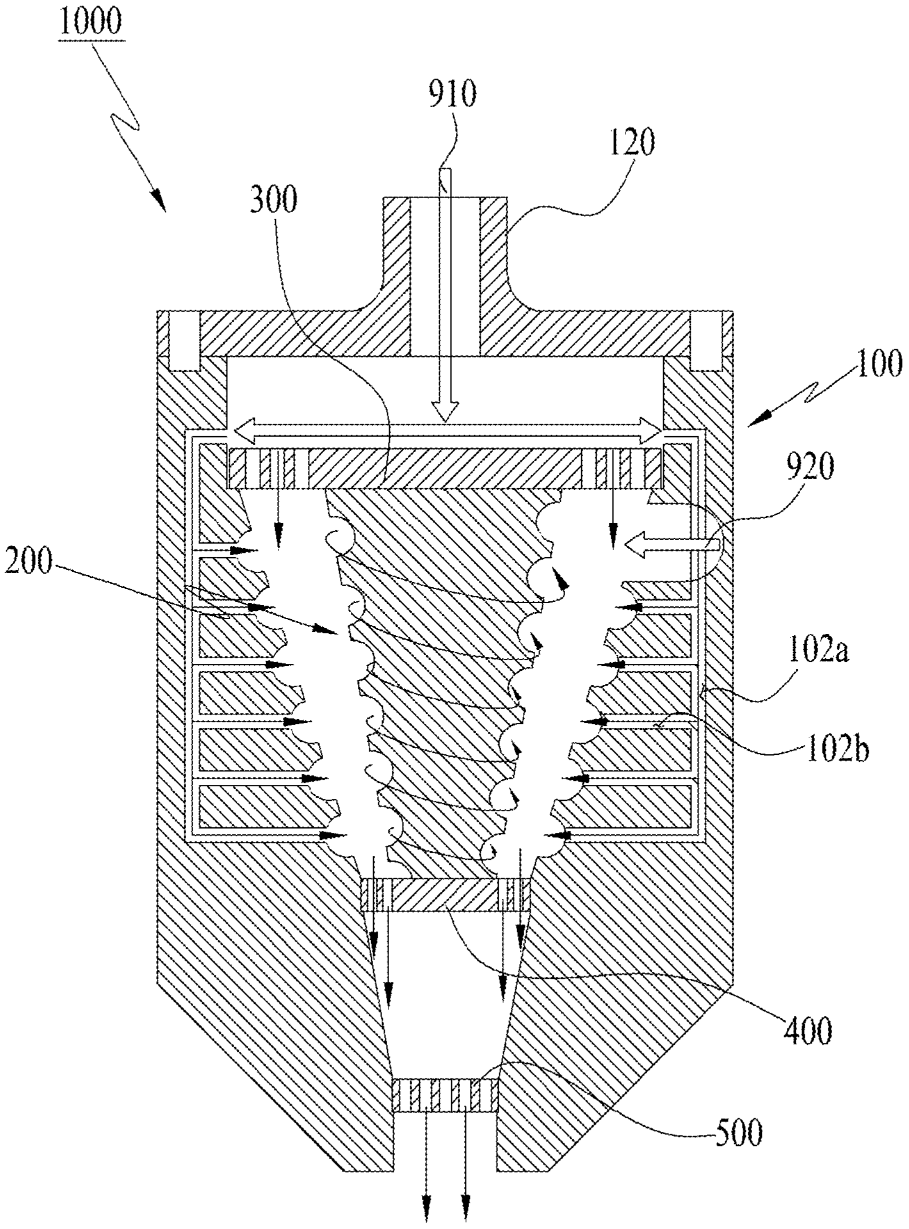
FIG. 5 is a longitudinal sectional view showing another embodiment of FIG. 3 wherein a first treatment liquid passes through the interior of the body and is thus supplied.

Further, as shown in FIG. 5, the body 100 has a second inside inlet hole 102*a* extending from one end facing a space above the first perforated plate 300 to the interior thereof in up and down directions and a plurality of second inside outlet holes 102*b* branched from the second inside inlet hole 102*a* toward the first mixing space portion 111.

That is, the first treatment liquid 910, which is supplied to the first inlet 120 of the body 100, is fed in a lateral direction through the second inside inlet hole 102*a* and the second inside outlet holes 102*b*, so that when mixed with the second treatment liquid 920, energy of vortexes and turbulent flows increase greatly to upgrade their mixing efficiency.

In detail, the first treatment liquid 910, which is supplied from the first inlet 120 of the body 100, basically passes through the first perforated plate 300 and sprays in a vertical direction, and further, the first treatment liquid 910 is branched through the second inside inlet hole 102*a* and the second inside outlet holes 102*b* and also sprays in the horizontal direction.

Further, the rotational flow guiding part 200 stands up inside the mixing space portion 110 in such a way as to allow top and underside thereto to face the first inlet 120 and the spray hole 140, and accordingly, the rotational flow guiding part 200 desirably has the shape of a partial cone whose sectional area decreases toward the spray hole 140 from the first inlet 120, while maintaining a circular cross-sectional shape.

That is, the rotational flow guiding part 200 becomes narrow in diameter from top toward underside, so that the vortexes are more collectedly generated toward the spray hole 140, thereby achieving smooth and stable spraying.

Further, as shown in FIG. 6, the rotational flow guiding part 200 has a spiral protrusion 201*a* or spiral groove 201*b* extending in up and down directions and formed on the outer peripheral surface thereof.

That is, if the spiral protrusion 201*a* or spiral groove 201*b* is formed on the rotational flow guiding part 200, the surface area coming into contact with the mixed treatment increases so that the vortexes are easily generated to liquids enhance the rotating forces of the mixed treatment liquids. Further, surface tension effect is strengthened so that when the treatment liquid spray nozzle moves after the treatment liquids have sprayed, the treatment liquids are prevented from being unwantedly dropped (so that water marks are formed on a substrate or the like).

As shown in FIG. 6, the spiral protrusion 201*a* or spiral groove 201*b* formed on the outer peripheral surface of the rotational flow guiding part 200 may have cross-sectional areas of various shapes such as partial circle, oval, square, polygon, triangle, and the like.

Figure 7:
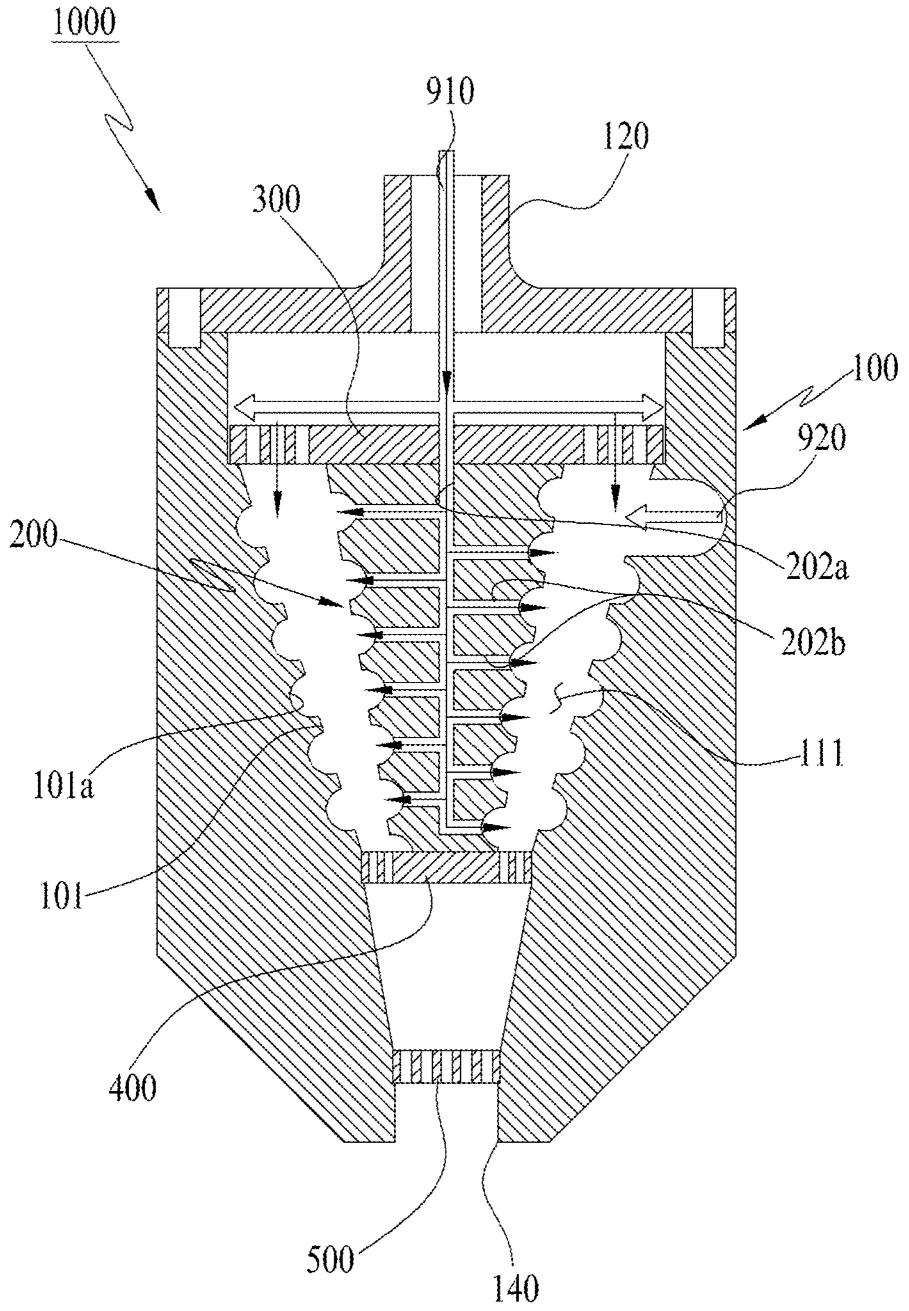
FIG. 7 is a longitudinal sectional view showing yet another embodiment of FIG. 3 wherein the first treatment liquid passes through the interior of the rotational flow guiding part and is thus supplied.

As shown in FIG. 7, the rotational flow guiding part 200 has a first inside inlet hole 202*a* extending from top facing the first inlet 120 to the interior thereof in up and down directions and a plurality of first inside outlet holes 202*b* branched from the first inside inlet hole 202*a* toward the first mixing space portion 111.

Desirably, the first inside inlet hole 202*a* is formed at a position facing the first inlet 120.

That is, the first treatment liquid 910, which is supplied to the first inlet 120 of the body 100, is fed in a lateral direction through the first inside inlet hole 202*a* and the first inside outlet holes 202*b* formed at the inside of the rotational flow guiding part 200, so that the energy of the first treatment liquid 910 colliding against the second treatment liquid 920 increases greatly, thereby upgrading their mixing efficiency.

Further, as shown in FIG. 3, the first perforated plate 300, the second perforated plate 400, and the third perforated plate 500 are located on tops of the first mixing space portion 111, the second mixing space portion 112, and the third mixing space portion 113 respectively.

The first treatment liquid 910 fed through the first inlet 120 collides against top of the first perforated plate 300 and distributedly scatters in a radial direction, and next, the first treatment liquid 910 vertically falls at uniform pressure and flow rate through the first through holes 310 of the first perforated plate 300 and is discharged to the first mixing space portion 111. In a process where the first treatment liquid 910 and the second treatment liquid 920 are mixed with each other in the first mixing space portion 111, further, the first perforated plate 300 serves to prevent some of the mixed treatment liquids from flowing back toward the first inlet 120.

Further, the first treatment liquid 910 vertically falls at uniform pressure and flow rate through the first through holes 310 of the first perforated plate 300 and is naturally mixed uniformly with the second treatment liquid 920 consistently introduced in the lateral direction, thereby improving their mixing efficiency.

Furthermore, the uniformly mixed treatment liquids immediately move to the outer peripheral surface of the rotational flow guiding part 200 in a tangential direction with respect to the rotational flow guiding part 200, thereby greatly improving the mixing efficiency through the generation of their vortexes.

The second perforated plate 400 is located on the entrance of the second mixing space portion 112 and serves to stabilize the mixed treatment liquids in the first mixing space portion 111 to uniform pressure through the second through holes 410 and increase the contact surface area with the mixed treatment liquids so that after the spraying has been completed, the treatment liquids are prevented from being unwantedly dropped.

The third perforated plate 500 is located on the entrance of the third mixing space portion 113 and serves to stabilize the flow of the mixed treatment liquids introduced through the second mixing space portion 112 to uniform pressure through the third through holes 510 and increase the contact surface area with the mixed treatment liquids again so that after the spraying has been completed, the treatment liquids are prevented from being unwantedly dropped.

The diameters, number, or distributed shapes of the first to third through holes 310, 410, and 510 formed on the first to third perforated plates 300, 400, and 500 may be freely determined.

The flows of the first treatment liquid 910 and the second treatment liquid 920 become uniform and stabilized through the first to third through holes 310, 410, and 510 formed on the first to third perforated plates 300, 400, and 500 installed respectively in the first mixing space portion 111, the second mixing space portion 112 and the third mixing space portion 113 whose cross-sectional areas reduced sequentially, thereby improving their mixing efficiency and preventing the remaining treatment liquids from being dropped. As a result, the perfectly mixed treatment liquids are discharged (sprayed) stably through the spray hole 140, thereby achieving uniform substrate treatment.

Figure 8A:
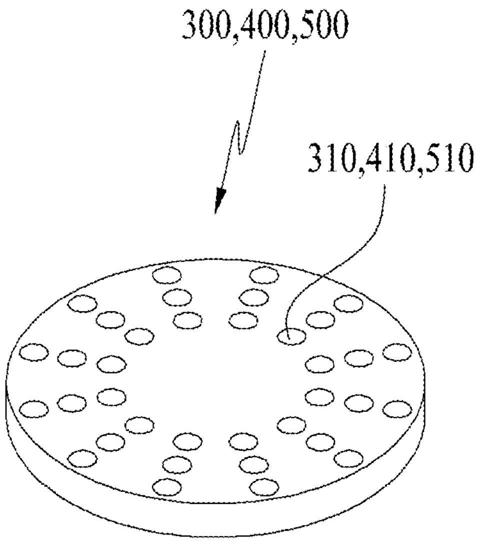
FIGS. 8A and 8B are perspective views showing a first perforated plate, a second perforated plate, and a third perforated plate of FIG. 3 and their another embodiments.
Figure 8B:
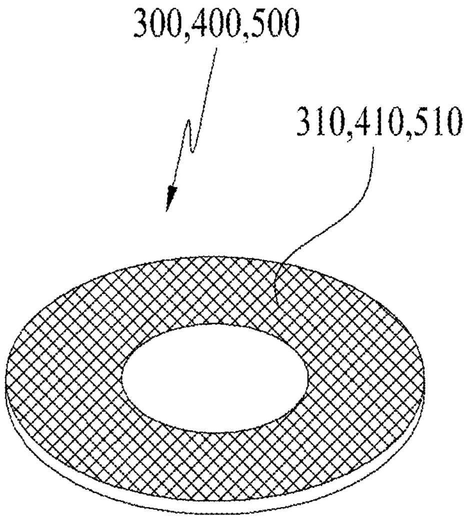

Further, as shown in FIG. 8, the first to third perforated plates 300, 400, and 500 are made of plates or mesh type plates each having the first to third through holes 310, 410, and 510 formed thereon.

As described above, the treatment liquid spray nozzle according to the present disclosure is configured to comprise a body having a mixing space portion formed therein to mix a first treatment liquid and a second treatment liquid, a first inlet communicating with the mixing space portion in such a way as to allow the first treatment liquid to flow into the mixing space portion, a second inlet communicating with the mixing space portion in a misaligned direction with the first inlet in such a way as to allow the second treatment liquid to flow into the mixing space portion, and a spray hole formed on the bottom thereof in such a way as to communicate with the mixing space portion; and a rotational flow guiding part disposed in the mixing space portion in such a way as to allow both ends thereof to face the first inlet and the spray hole, while allowing the sectional area toward the spray hole to be smaller than the sectional area toward the first inlet, wherein on top of the rotational flow guiding part is located a first perforated plate in such a way as to be coupled to the inner peripheral surface of the mixing space portion, on underside of the rotational flow guiding part is located a second perforated plate in such a way as to be coupled to the inner peripheral surface of the mixing space portion, and the second inlet is located under the first perforated plate, so that the first treatment liquid introduced through the first inlet collides against top of the rotational flow guiding part, spreads in a radial direction of the rotational flow guiding part, and is descended uniformly through the first perforated plate, and then, the first treatment liquid meets with the second treatment liquid introduced through the second inlet and moving along the inner peripheral surface of the first mixing space portion and is naturally mixed with the second treatment liquid, and after that, the mixed treatment liquids move along the outer peripheral surface of the rotational flow guiding part, while generating the vortexes, so that the treatment liquids are mixed more smoothly and uniformly and then discharged through the spray hole, without any difficulty.

According to the present disclosure, further, the treatment liquid spray nozzle is configured to comprise a first perforated plate formed between the first inlet and the mixing space portion, and at least one perforated plates from a lower end of the rotational flow guiding part to a lower end of the spray hole, so that the mixing efficiency of the first treatment liquid and second treatment liquid can be further improved, the flow of the mixed treatment liquids can be stabilized, and the contact surface area with the mixed treatment liquids can be increased to prevent the treatment liquids unwantedly dropped.

According to the present disclosure, further, the mixing space portion comprises: a first mixing space portion extending from the first perforated plate to the underside of the rotational flow guiding part; a second mixing space portion extending from the underside of the first mixing space portion to top of the spray hole; and a third mixing space portion extending from top of the spray hole to underside of the spray hole, whereby the second perforated plate to which the rotational flow guiding part is coupled is located on the entrance of the second mixing space portion, and the third perforated plate is located on the entrance of the spray hole, so that the flows of the first treatment liquid and the second treatment liquid become uniform and stabilized.

According to the present disclosure, further, the rotational flow guiding part has a spiral protrusion or groove extending in up and down directions and formed on the outer peripheral surface thereof, so that the surface area in contact with the mixed treatment liquid can be increased, thereby the rotational force of the vortex can be increased and unwanted treatment liquid drops, which may cause watermarks on the wafer to be generated, can be prevented even when the treatment liquid spray nozzle moves after the treatment liquid spraying has been completed.

According to the present disclosure, further, the mixing space portion of the body that extends from the first perforated plate to the underside of the rotational flow guiding part has a spiral protrusion or groove extending in up and down directions and formed on the inner peripheral surface thereof, so that an effect of maximizing energy of the vortex for mixing the treatment liquid can be provided.

According to the present disclosure, further, the rotational flow guiding part comprises a first inside inlet hole extending from top facing the first inlet to the interior thereof in up and down directions and a plurality of first inside outlet holes branched from the first inside inlet hole toward the mixing space portion, so that the first treatment liquid, which is supplied to the first inlet of the body, is fed in a lateral direction through the first inside inlet hole and the first inside outlet holes formed at the inside of the rotational flow guiding part, thereby the energy of the first treatment liquid colliding against the second treatment liquid increases greatly, thereby upgrading their mixing efficiency.

According to the present disclosure, further, the body comprises a second inside inlet hole extending from one end facing a space above the first perforated plate to the interior thereof in up and down directions and a plurality of second inside outlet holes branched from the second inside inlet hole toward the mixing space portion, so that the first treatment liquid, which is supplied to the first inlet of the body, is fed in a lateral direction through the second inside inlet hole and the second inside outlet holes, and when mixed with the second treatment liquid, energy of vortexes and turbulent flows increase greatly to upgrade their mixing efficiency.

The present disclosure may be modified in various ways and may have several exemplary embodiments. It is therefore intended that the scope of the disclosure be limited not by this detailed description, but rather by the claims appended hereto, and it should be understood that the disclosure covers all the modifications, equivalents, and replacements within the idea and technical scope of the disclosure.

What is claimed is:

1. A treatment liquid spray nozzle comprising:

a body having a mixing space portion formed therein to mix a first treatment liquid and a second treatment liquid, a first inlet communicating with the mixing space portion to allow the first treatment liquid to flow into the mixing space portion, a second inlet communicating with the mixing space portion in a misaligned direction with the first inlet to allow the second treatment liquid to flow into the mixing space portion, and a spray hole formed on the bottom thereof to communicate with the mixing space portion; and a rotational flow guiding part disposed in the mixing space portion to allow both ends thereof to face the first inlet and the spray hole, while allowing a sectional area toward the spray hole to be smaller than a sectional area toward the first inlet, wherein on top of the rotational flow guiding part is located a first perforated plate to be coupled to an inner peripheral surface of the mixing space portion, on underside of the rotational flow guiding part is located a second perforated plate to be coupled to the inner peripheral surface of the mixing space portion, and the second inlet is located under the first perforated plate.

2. The treatment liquid spray nozzle according to claim 1, wherein the mixing space portion comprises:

a first mixing space portion extending from the first perforated plate to the underside of the rotational flow guiding part;

a second mixing space portion extending from the underside of the first mixing space portion to top of the spray hole; and a third mixing space portion extending from top of the spray hole to underside of the spray hole, whereby the second perforated plate to which the rotational flow guiding part is coupled is located on the entrance of the second mixing space portion, and the third perforated plate is located on the entrance of the spray hole.

3. The treatment liquid spray nozzle according to claim 2, wherein the entrance of the second mixing space portion has a larger cross-sectional area than the entrance of the spray hole.

4. The treatment liquid spray nozzle according to claim 1, wherein the rotational flow guiding part has a spiral protrusion or groove extending in up and down directions and formed on an outer peripheral surface thereof.

5. The treatment liquid spray nozzle according to claim 1, wherein the mixing space portion of the body that extends from the first perforated plate to the underside of the rotational flow guiding part has a spiral protrusion or groove extending in up and down directions and formed on the inner peripheral surface thereof.

6. The treatment liquid spray nozzle according to claim 1, wherein the rotational flow guiding part comprises a first inside inlet hole extending from top facing the first inlet to the interior thereof in up and down directions and a plurality of first inside outlet holes branched from the first inside inlet hole toward the mixing space portion.

7. The treatment liquid spray nozzle according to claim 6, wherein the first inside inlet hole is formed at a position facing the first inlet.

8. The treatment liquid spray nozzle according to claim 1, wherein the body comprises a second inside inlet hole extending from one end facing a space above the first perforated plate to the interior thereof in up and down directions and a plurality of second inside outlet holes branched from the second inside inlet hole toward the mixing space portion.

9. The treatment liquid spray nozzle according to claim 1, wherein the rotational flow guiding part comprises a first inside inlet hole extending from top facing the first inlet to the interior thereof in up and down directions and a plurality of first inside outlet holes branched from the first inside inlet hole toward the mixing space portion, and the body comprises a second inside inlet hole extending from one end facing a space above the first perforated plate to the interior thereof in up and down directions and a plurality of second inside outlet holes branched from the second inside inlet hole toward the mixing space portion.

10. The treatment liquid spray nozzle according to claim 1, wherein a flow rate of the first treatment liquid is smaller than a flow rate of the second treatment liquid.

11. The treatment liquid spray nozzle according to claim 1, wherein the first to third perforated plates are made of plates or mesh type plates each having a plurality of through holes.

* * * * *